United States Patent [19]
Waszkiewicz, Jr.

[11] 3,857,916
[45] Dec. 31, 1974

[54] METHOD OF SEALING AN OPEN TOPPED VESSEL

[76] Inventor: John C. Waszkiewicz, Jr., Middle Settlement Rd., New Hartford, N.Y. 13413

[22] Filed: June 22, 1970

[21] Appl. No.: 48,196

[52] U.S. Cl. .................... 264/85, 264/161, 264/268
[51] Int. Cl. ...................... B29c 17/08, B29c 13/02
[58] Field of Search ............. 264/267, 268, 161, 85, 264/271, 279

[56] References Cited
UNITED STATES PATENTS

| 227,408 | 5/1880 | Bowman | 264/161 X |
| 3,288,901 | 11/1966 | Clark | 264/267 |
| 3,328,502 | 6/1967 | Robson | 264/161 |
| 3,331,904 | 7/1967 | Friedman | 264/161 X |
| 3,518,340 | 6/1970 | Raper | 264/268 X |

FOREIGN PATENTS OR APPLICATIONS

| 892,327 | 4/1944 | France | 264/267 |
| 1,312,348 | 11/1962 | France | 264/85 |

OTHER PUBLICATIONS
Ratcliff, "Nitrogen: Industrial Cinderella," 86 Science News Letter 90 (8/1964).
Lee & Neville, Handbook of Epoxy Resins (1967), pp. 7-2-7-7, 16-4, 16-5, 17-45, 17-46, TP 1180.E6 L4 C.4.

Primary Examiner—Robert F. White
Assistant Examiner—James B. Lowe
Attorney, Agent, or Firm—Bruns and Jenney

[57] ABSTRACT

A method of sealing an open topped glass or plastic vessel containing preserved flowers or the like by forming a permanent clear plastic top closure on the vessel. This is accomplished by pouring a clear liquid resin mixture onto a glass plate and placing the vessel, with the flowers secured to the bottom thereof, upside down in the puddle formed by the mixture. After the mixture has cured, the excess is trimmed away, the top closure adhering tightly to the top edge of the vessel and having substantially the same coefficient of expansion and contraction.

6 Claims, 2 Drawing Figures

PATENTED DEC 31 1974

3,857,916

INVENTOR.
JOHN C. WASZKIEWICZ, JR.

BY
Bruns & Jenney,
ATTORNEYS

METHOD OF SEALING AN OPEN TOPPED VESSEL

BACKGROUND OF THE INVENTION

This invention relates to a method of forming a permanent top closure for a glass or plastic vessel, and has particular reference to the formation of a closure of clear plastic which will have substantially the same coefficient of expansion and contraction as the vessel itself.

Preserved flowers and other objects of nature are frequently mounted in open topped glass vessels and it is desirable to have a top closure to prevent the accumulation of dust and dirt in the vessel and also to prolong the life of the specimen. Heretofore, these closures have usually taken the form of a glass plate which may detract from the attractive appearance of the vessel and specimen and can be difficult to adhesively secure to the vessel. The applicant herein has experimented extensively with forming permanent, clear plastic tops on vessels but, prior to the present invention, encountered difficulties with glass cracking or breakage because of the different coefficients of expansion of the glass and plastic.

SUMMARY OF THE INVENTION

In the present invention, the material which is used to form the tops of the vessels is, in its initial state, a carefully formulated liquid mixture of epoxy resin, a curing agent and a plasticizer. This mixture is poured onto a glass plate or the like where it forms a puddle, and the vessel to be sealed is placed upside down in the puddle and left there until the mixture has cured. The top that is thus formed is a perfectly clear plastic sheet which adheres tightly to the top edge of the vessel and which, after the excess material has been trimmed away and the edge buffed, has the appearance of being an integral part of the vessel itself.

Since glass vessels are most often sealed by the method of the invention, an important objective of the invention is to provide a top forming plastic mixture which results in a top that has substantially the same coefficient of expansion and contraction as the glass over a wide range of temperatures. This eliminates the problems of glass cracking or of a possible rupture between the glass and plastic which problems have been encountered in applicant's previous attempts to develop a workable method leading to lasting end results.

DESCRIPTION OF THE PREFERRED EMBODIMENT

Figure 2:
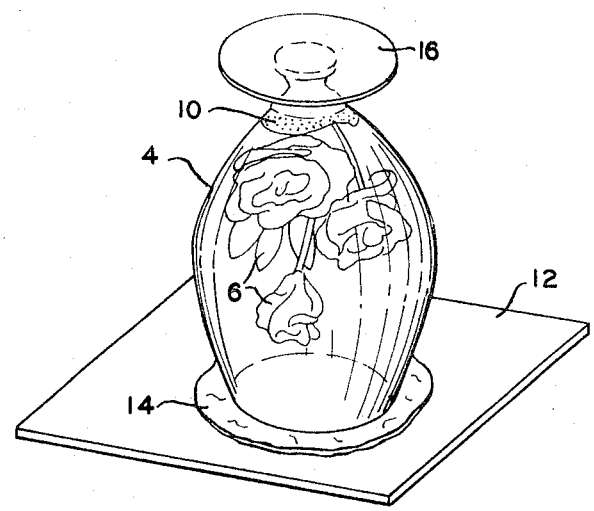
FIG. 2 is a reduced perspective view illustrating a method step of forming the top on the vessel.

In carrying out the method of the invention, a clear glass vessel such as the brandy snifter 4 shown in the drawings may be used for displaying the preserved flowers or any other specimen desired. The specimen shown is a bouquet of preserved roses 6 which are supported in the vessel in the arrangement desired by inserting their stems 8 in an adhesive mass 10 positioned in the bottom of the snifter. The mass 10, the composition of which is not per se a part of the method of the present invention, has the characteristic of being hardenable after receiving the flower stems and of adhering tightly to the glass at the bottom of the snifter. It may be colored green or any other suitable color.

After mounting the flowers or other specimen to be displayed in the vessel, it is of course advantageous to seal it by providing a top so that dirt and dust do not accumulate on the flowers, which would be difficult to clean, and further to protect them from damage. In forming the top, the first step is to mix together a highly refined epoxy resin, a formulated amine curing agent and a plasticizer, all of which are in liquid form and are commercially available products. The mixing may be manual or by mechanical means, and the materials are preferably in the proportions of 100 parts by weight of the resin to 29 parts by weight of the curing agent to 8 parts by weight of the plasticizer. Normally, the resin and plasticizer are mixed together first and then the curing agent added because the latter starts the reaction which occurs.

The mixing is done under conditions of controlled temperature and humidity with the permissable temperature range between 65°–90° F. and the relative humidity range being 40–50%. Ideally, mixing is done at a temperature of 78°F. with a relative humidity of 45%. After the materials have been thoroughly mixed, the mixture is left to sit for 5 to 10 minutes to permit the air bubbles to rise. This can also be accomplished by the well known technique of rinsing a large glass dome with acetone and placing it over the container for the mixture to draw the air bubbles out.

Referring now to FIG. 2, the next step is to pour the mixture onto a double thickness piece or sheet of plate glass 12, the surface of which has been covered with a mold release compound (not shown). The amount of the mixture that is deposited is carefully measured and depends upon the area of the top opening of the vessel to be sealed. The liquid plastic mixture forms a puddle 14 on the glass plate 12, and the snifter 4 is placed upside down on the plate with the edge of its open top in the mixture puddle as shown. The flowers 6 which were previously mounted in the snifter are suspended above the puddle because they have been securely attached to the snifter bottom by the mass 10.

Just prior to placing the snifter on the glass plate, it is held in an upside down position and nitrogen gas under moderate pressure is discharged into it to clean out any foreign matter and force out the air. The snifter is maintained in the upside down position until placed on the glass plate so that the nitrogen stays in it.

Figure 1:
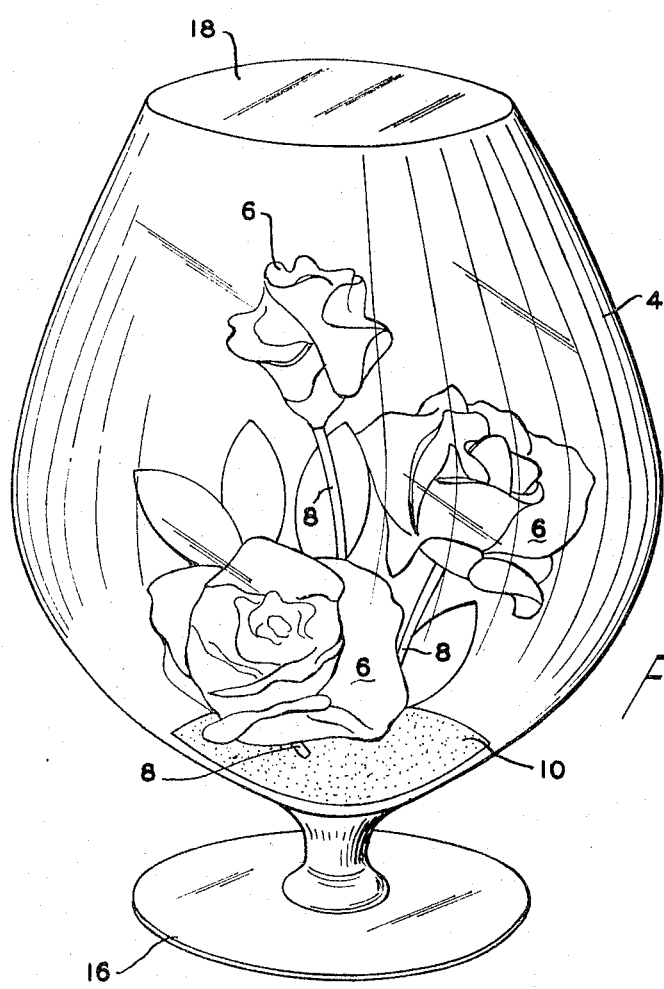
FIG. 1 is a perspective view of a clear glass vessel sealed with a clear plastic top closure formed by the method of the invention.

The snifter 4 is left on the plate as shown in FIG. 2 for at least 16 hours while the plastic mixture hardens and cures. Thereafter, the hardened mixture sheet is separated from the plate as by pushing against the base 16 of the snifter. The excess plastic material is then trimmed away and the upper edge of the snifter buffed so that the transition between the glass and plastic is perfectly smooth and no joint or division line appears. The resultant top closure 18, FIG. 1, is a perfectly clear and smooth plastic sheet which hermetically seals the vessel interior and displayed specimen. Moreover, the plastic mixture and method of formulation result in a top having substantially the same coefficient of expansion and contraction as the glass over a wide temperature range.

From the foregoing description, it will be apparent that the invention provides a novel method of sealing an open topped vessel leading to an attractive and durable end product. As will be understood to those familiar with the art, the invention may be embodied in other specific forms without departing from the spirit or essential characteristics thereof.

I claim:

1. In a method of sealing an open topped vessel, the steps of:
   a. mixing together liquid epoxy resin, a liquid amine curing agent and a liquid plasticizer, the resin comprising at least 70% by weight of the mixture;
   b. pouring the mixture onto a glass plate having a surface covering of mold release so that the mixture forms a puddle thereon;
   c. placing the vessel to be sealed upside down on the glass plate with the edge of its open top in the mixture puddle;
   d. leaving the vessel as stated above for at least sixteen hours while the mixture cures;
   e. removing the vessel and cured mixture, which now forms a top closure for the vessel, from the glass plate; and
   f. trimming the excess cured mixture from the edge of the vessel.

2. The method as defined by claim 1 wherein the mixture consists of 100 parts by weight of the resin, 29 parts by weight of the curing agent and 8 parts by weight of the plasticizer.

3. The method as defined by claim 1 wherein the mixing is carried out in an ambient temperature range of 65°–90°F.

4. The method as defined by claim 1 wherein the mixing is carried out in an ambient relative humidity range of 40–50%.

5. A method of sealing preserved flowers in an open topped glass or plastic vessel by forming a permanent top closure for the vessel, comprising the steps of:
   a. securing the stems of the flowers to the bottom of the vessel so that they are supported upright therein;
   b. mixing together 100 parts by weight of liquid epoxy resin, 29 parts by weight of a liquid amine curing agent and 8 parts by weight of a liquid plasticizer in an ambient temperature range of 70°–80°F. and relative humidity range of 40–50%;
   c. allowing the mixture to sit long enough for any air bubbles to rise;
   d. pouring the mixture onto a glass plate having a surface covering of mold release so that the mixture forms a puddle thereon;
   e. placing the vessel upside down, with the flowers suspended from the bottom thereof, on the glass plate with the edge of its open top in the mixture puddle;
   f. leaving the vessel as stated above for at least 16 hours while the mixture cures;
   g. removing the vessel and cured mixture, which now forms a top closure for the vessel, from the glass plate; and
   h. trimming the excess cured mixture from the edge of the vessel and then buffing said edge.

6. The method as defined by claim 5 together with the step of shooting nitrogen gas into the vessel before placing it upside down in the mixture puddle.

* * * * *